(12) United States Patent
Na et al.

(10) Patent No.: US 10,073,567 B2
(45) Date of Patent: Sep. 11, 2018

(54) INTERACTIVE DISPLAY SYSTEMS

(71) Applicant: PIQS TECHNOLOGY (SHENZHEN) LIMITED, Shenzhen, Guangdong (CN)

(72) Inventors: Qinglin Na, Guangdong (CN); Yan Huang, Guangdong (CN); Haohuang Mai, Guangdong (CN)

(73) Assignee: PIQS TECHNOLOGY (SHENZHEN) LIMITED, Shenzhen (CN)

( * ) Notice: Subject to any disclaimer, the term of this patent is extended or adjusted under 35 U.S.C. 154(b) by 30 days.

(21) Appl. No.: 15/313,559

(22) PCT Filed: May 23, 2014

(86) PCT No.: PCT/CN2014/078345
§ 371 (c)(1),
(2) Date: Nov. 23, 2016

(87) PCT Pub. No.: WO2015/176325
PCT Pub. Date: Nov. 26, 2015

(65) Prior Publication Data
US 2017/0212640 A1     Jul. 27, 2017

(51) Int. Cl.
| | |
|---|---|
| *G06F 3/033* | (2013.01) |
| *G09G 5/08* | (2006.01) |
| *G09G 5/00* | (2006.01) |
| *G06F 3/042* | (2006.01) |
| *G06F 3/14* | (2006.01) |
| *G02B 27/10* | (2006.01) |
| *H04N 5/225* | (2006.01) |
| *H04N 9/31* | (2006.01) |

(52) U.S. Cl.
CPC ....... *G06F 3/0421* (2013.01); *G02B 27/1013* (2013.01); *G06F 3/1423* (2013.01); *H04N 5/2257* (2013.01); *H04N 9/317* (2013.01)

(58) Field of Classification Search
CPC .......... G02B 27/0172; G02B 2027/014; G02B 27/0176; G06F 3/013; G06F 3/017
See application file for complete search history.

(56) References Cited

U.S. PATENT DOCUMENTS

| | | | | |
|---|---|---|---|---|
| 5,400,093 | A * | 3/1995 | Timmers | G02B 7/32 348/745 |
| 2003/0210229 | A1* | 11/2003 | Nishimura | G06F 3/0386 345/157 |
| 2011/0241986 | A1* | 10/2011 | Feng | G03B 21/14 345/158 |

* cited by examiner

*Primary Examiner* — Nan-Ying Yang

(57) ABSTRACT

Disclosed is an interactive display system, comprising a main control unit for processing information, a display unit for generating a display image, one or more remote control units, and a monitoring module assembly; the main control unit has a communication connection with the display unit and the monitoring module assembly; each remote control unit comprises an infrared emission module assembly used to emit infrared light of two different wavelengths to the display image to generate an infrared light spot; the monitoring module assembly comprises a monitoring lens for capturing the infrared light spot within the display image, a first light splitting element, and a first and a second infrared monitoring element with respect to the different wavelength from the remote control. This disclosure provides multiple-point interaction on a single display image. User can easily interact with the display image just like the touch-panel which helps enhance interactive experience.

9 Claims, 4 Drawing Sheets

INTERACTIVE DISPLAY SYSTEMS

TECHNICAL FIELD

This disclosure relates to display system fields, and particularly to interactive display systems.

BACKGROUND

Projectors or large-size FPDs (flat panel display) have been commonly used in people's daily study, work and entertainment recently. With the development of science and technology, however, it is difficult for conventional input devices to meet people's demands on human-computer interaction. A laser pen is used to point at a display image for indication in the conventional human-computer interaction, while the pointed display system cannot obtain a position coordinate of an indication point and further cannot implement interactive operation commands. Moreover, only a single laser pen can be used for indication in the general display system, and multi-point interactive operations cannot be achieved simultaneously on one picture.

SUMMARY OF THIS DISCLOSURE

The technical problems to be solved in this disclosure are to provide interactive display systems that enable multi-touch.

To solve the above technical problems, this disclosure provides an interactive display system. The interactive display system includes a main control unit for information processing, a display unit for generating a display image according to received display information, one or more remote control unit(s), and a monitoring module assembly. The main control unit is in communication connection with the display unit and the monitoring module assembly.

Each remote control unit includes an infrared emission module assembly, which infrared emission module assembly is used to emit two infrared lights with different wavelengths to the display image for generating an infrared light spot thereon.

The monitoring module assembly includes a monitoring lens for capturing the infrared light spot within the display image, a first light splitting element arranged behind the monitoring lens, a first infrared monitoring element and a second infrared monitoring element. The first light splitting element is used for separating a first infrared light and a second infrared light having different wavelengths. The first infrared light and the second infrared light having different wavelengths are respectively incident onto the first infrared monitoring element and the second infrared monitoring element.

The interactive display system support simultaneous operations of the multiple remote control units, where when one of the remote control units is in operation within the display image, other remote control units can also enter into and generate an icon in the display image, but those other remote control units is prevented from executing an interactive operation until receiving an interactive operation signal.

In the multi-touch interactive display system of this disclosure, when the monitoring lens captures the infrared light spot generated within the display image by each of the remote control units, the two infrared lights having different wavelengths pass through the first light splitting element and then the first infrared light is imaged onto the first infrared monitoring element to form a first imaging image. Position information of the infrared light spot in the first imaging image is outputted to the main control unit from the first infrared monitoring unit, and the icon is displayed at the position of the infrared light spot on the display image of the display unit after the main control unit performs the information processing.

In the multi-touch interactive display system of this disclosure, when the monitoring lens captures the infrared light spot generated within the display image by each of the remote control units, the two infrared lights having different wavelengths pass through the first light splitting element and then the second infrared light is imaged onto the second infrared monitoring element to form a second imaging image. Position information of the infrared light spot in the second imaging image is outputted to the main control unit from the second infrared monitoring unit, and the interactive operation is performed at the position of the infrared light spot on the display image of the display unit after the main control unit performs the information processing.

In the interactive display system of this disclosure, the display unit is a flat panel display unit.

In the interactive display system of this disclosure, the display unit is a projector, where the projector is an independent apparatus or the projector and the monitoring module assembly are integrated within a same housing.

The projector includes a projector fixture and a projection lens. The projection lens and the monitoring lens are arranged side by side. The projection lens includes at least one lens group that is moveable, where light from the projector fixture passes through the at least one lens group of the projection lens and then gets emitted out to form the display image on a screen.

In the interactive display system of this disclosure, the remote control unit also includes a first infrared emission module, a second infrared emission module, a trigger apparatus and a collimating lens element; the trigger apparatus connects with the second infrared emission module and controls the second infrared emission module to send the interactive operation signal. The infrared emission module assembly includes a first infrared light source, a second infrared light source and a light merging element.

The first infrared light source emits the infrared light having a first wavelength after having received an emission signal from the first infrared emission module. The trigger apparatus is activated, and the second infrared light source emits the infrared light having a second wavelength after having received the interactive operation signal from the second infrared emission module. The two infrared lights are merged by the light merging element and then emitted out through the collimating lens element.

In the interactive display system of this disclosure, both the first infrared light source and the second infrared light source include an infrared laser light source or an LED infrared light source.

In the interactive display system of this disclosure, the monitoring module assembly also includes a second light splitting element arranged behind the monitoring lens and a visible light monitoring element corresponding to a visible light. The second light splitting element operates to separate the visible light, the first infrared light and the second infrared light which two infrared lights have different wavelengths.

In the interactive display system of this disclosure, the monitoring module assembly also includes a third light splitting element arranged behind the monitoring lens and a visible light monitoring element corresponding to a visible light. The third light splitting element operates to separate the visible light, the first infrared light and the second infrared light which two infrared lights have different wavelengths.

In the interactive display system of this disclosure, the monitoring module assembly also includes a focusing apparatus for driving the movement of the at least one lens group of the projection lens. The focusing apparatus includes a focusing control unit and a focusing motor, where the focusing control unit connects with the visible light monitoring element and the focusing motor connects with the at least one lens group of the projection lens. The focusing control unit sends out control signal to the focusing motor, and the focusing motor can drive the movement of the at least one lens group. Here, a field angle of the monitoring lens is larger than or equal to that of the projection lens. The first infrared monitoring element, the second infrared monitoring element and the visible light monitoring element are of the same model.

When implementing the technical solution of this disclosure, at least the following advantageous effect can be achieved: the interactive display system in this disclosure support the simultaneous operation of multiple remote control units. That is, when one remote control unit is being operated within the display image, other remote control units can enter into and generates the icon on the display image, and those other remote control will not execute the interactive operation until they have received touch operation signal. In this way, users can simultaneously have multi-point interactive operation within one display image, thereby improving human-computer interactive experience and enhancing an operability of the display system.

BRIEF DESCRIPTION OF THE DRAWINGS

This disclosure is further described with reference to accompanying drawings and embodiments below. In the figures.

Figure 1:
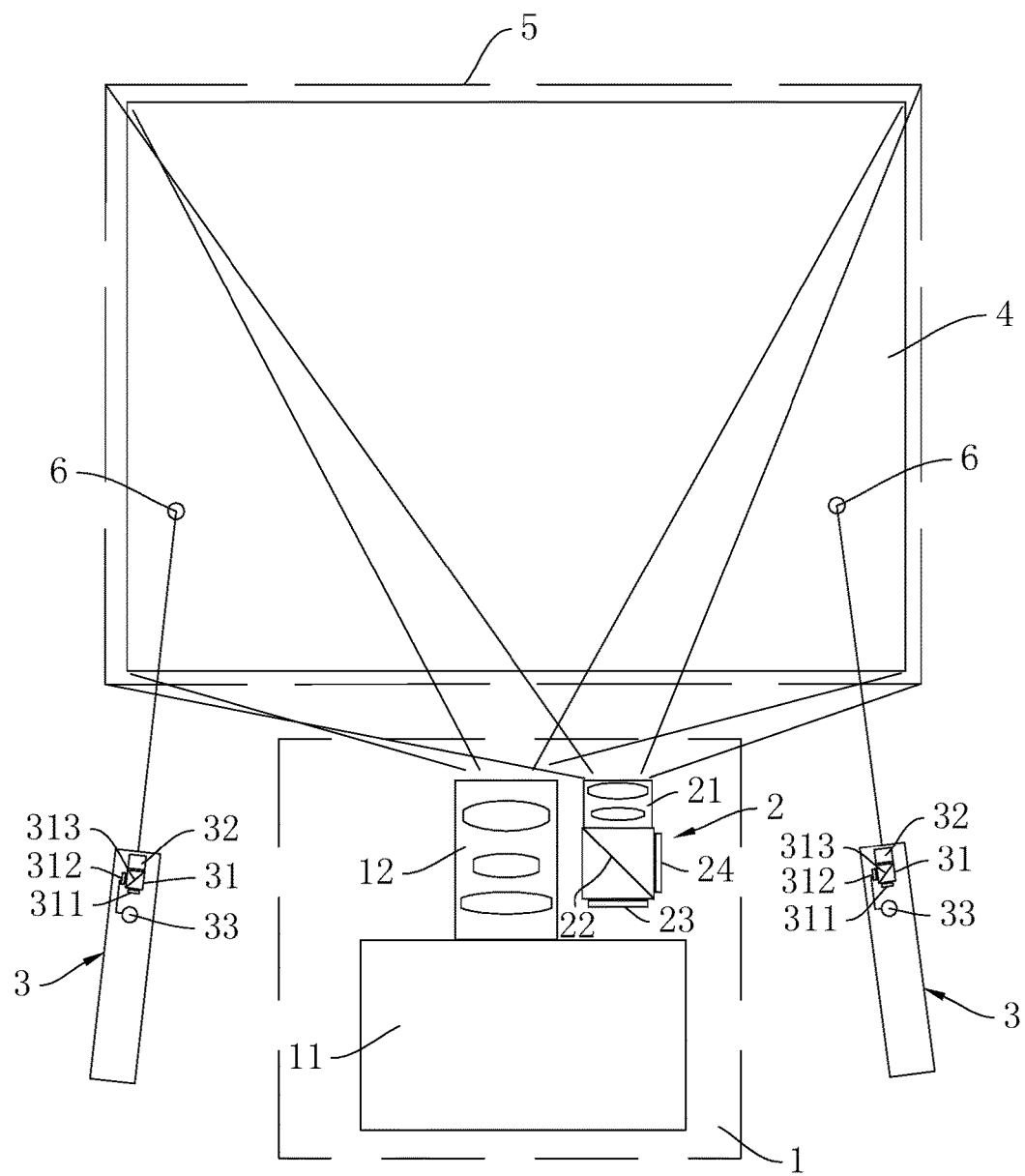
FIG. 1 is a structural diagram for a multi-touch interactive display system according to an embodiment of this disclosure.

DESCRIPTION OF REFERENCE SIGNS 1 projector
11 projector fixture
12 projection lens
2 monitoring module assembly
21 monitoring lens
22 first light splitting element
23 first infrared monitoring element
24 second infrared monitoring element
25 visible light monitoring element
26 second light splitting element
27 third light splitting element
3 remote control unit
31 infrared emission module assembly
311 first infrared light source
312 second infrared light source
313 light merging element
32 collimating lens element
33 button
4 display image
5 monitoring image
6 infrared light spot
7 first infrared light
8 second infrared light
9 visible light

DETAILED DESCRIPTION

Specific implementations of this disclosure are described in detail with reference to accompanying drawings so that technical features, objectives and effects of this disclosure can be understood more clearly.

FIGS. 1-6 illustrate an interactive display system of this disclosure. The interactive display system can enable users to simultaneously have multi-point interactive operations in one display image 4, thereby greatly improving human-computer interactive experience and enhancing convenience of usage. The interactive display system includes a main control unit, a display unit, a remote control unit 3 and a monitoring module assembly 2.

In some embodiments, the main control unit operates for information processing. The main control unit communicates with the display unit and the monitoring module assembly 2 in such a way that it receives signals outputted from the display unit and the monitoring module assembly, performs analysis and comparison on the signals, and generates command signals that are then outputted to the display unit and the monitoring module assembly 2.

It can be understood that the main control unit can be designed as an independent device; alternatively, the main control unit and the monitoring module assembly 2 can be integrated within a same housing. Benefit of using an independent device as the main control unit lies in that not only the display unit and the monitoring module assembly 2 but also any other functional units can be in communication connection with the main control unit, which brings help to function development of the whole system. When the main control unit and the monitoring module assembly 2 are designed to be integrated within the same housing, the whole system becomes convenient in assembling and relocation. Since the multi-touch interactive display system is suitable for various situations and scenes (i.e., having certain portability), the whole system having higher integration level can be more convenient in usage and higher in operation efficiency especially for work place.

In some embodiments, the display unit mainly operates for generating a display image 4 according to received display information. It can be understood that a large-size FPD unit (flat panel display) or a projector 1 can be applied as the display unit. It is mentioned that the multi-touch interactive display system of this disclosure is generally suitable for most of the common display units in daily life, and users can make customization based on their own needs due to the applicability of the interactive display system.

Further, the interactive display system can have one or more remote control unit(s) 3 in this disclosure, by which the users can simultaneously perform the interactive operation(s) at one or more point(s) in the display image 4 generated on the above-described display unit.

In some embodiments, the remote control unit 3 includes an infrared emission module assembly 31, a first infrared emission module, a second infrared emission module, a button 33 connected with the second infrared emission module and a collimating lens element 32. The second infrared emission module is controlled to send signals by the button 33.

The infrared emission module assembly operates to emit two kinds of infrared lights with different wavelengths onto the display image 4 to generate an infrared light spot 6. The infrared emission module assembly includes a first infrared light source 311, a second infrared light source 312 and a light merging element 313.

The first infrared light source 311 may emit an infrared light with a wavelength (i.e., a first infrared light 7) after having received an emission signal from the first infrared emission module. The button 33 is then pressed down, and the second infrared light source 312 may emit an infrared light with another wavelength (i.e., a second infrared light 8) after having received an emission signal from the second infrared emission module. It can be understood that the button 33 stands for one of various trigger apparatuses that are capable of controlling the second infrared emission module to send an interactive operation signal, while any other conventional trigger apparatus, such as virtual key, wireless control and so on, can be included in the protection scope of this disclosure. The two infrared lights are merged by the light merging element 313 and then emitted out through the collimating lens element 32.

It can be understood that when the infrared light spot 6 generated by the first infrared light 7 is captured, a visible icon can be generated by analyzing the position information of the infrared light spot 6. During operation, the visible icon is required to be constantly present in the display image 4 for interaction indication, and thus the first infrared light source 311 for generating the first infrared light 7 keeps being in operation. When the infrared light spot 6 generated by the second infrared light 8 is captured, the interactive operation can be performed by analyzing the position information of the infrared light spot 6. During operation, manual control may include human-computer interaction or some interactive operations such as touching, enlarging or dragging; that is, the button 33 is pressed down for the interactive operation by the user when there is need for the human-computer interaction, and thus the second infrared light source 312 for generating the second infrared light 8 is powered on or off under the control of a switch or the button 33.

Further, the light merging element 313 mainly operates for combining two kinds of infrared lights having different wavelengths, so that the infrared light spots 6 projected onto the display unit by the first infrared light 7 and the second infrared light 8 coincide with each other. It can be understood that the light merging element 313 can be a right-angle prism, where the first infrared light source 311 is arranged on one right-angle side of the right-angle prism and the second infrared light source 312 is arranged opposite to the other right-angle side of the right-angle prism in such a way that the first and the second infrared light sources are perpendicular to each other. A light splitting membrane refracting the first infrared light 7 and reflecting the second infrared light 8 is arranged on a hypotenuse of the right-angle prism, so that the first infrared light 7 and the second infrared light 8 emitted out from the right-angle prism are basically combined with each other. Alternatively, any other conventional light merging element 313 or light merging mode are included in the protection scope of this disclosure.

In addition of the above-described main control unit, the display unit and the remote control unit 3, a monitoring module assembly 2 can also be included so as to achieve the multi-touch interactive operation in this disclosure. Preferably, the monitoring module assembly 2 is arranged directly opposite to the display image 4 generated by the display unit.

Figure 2:
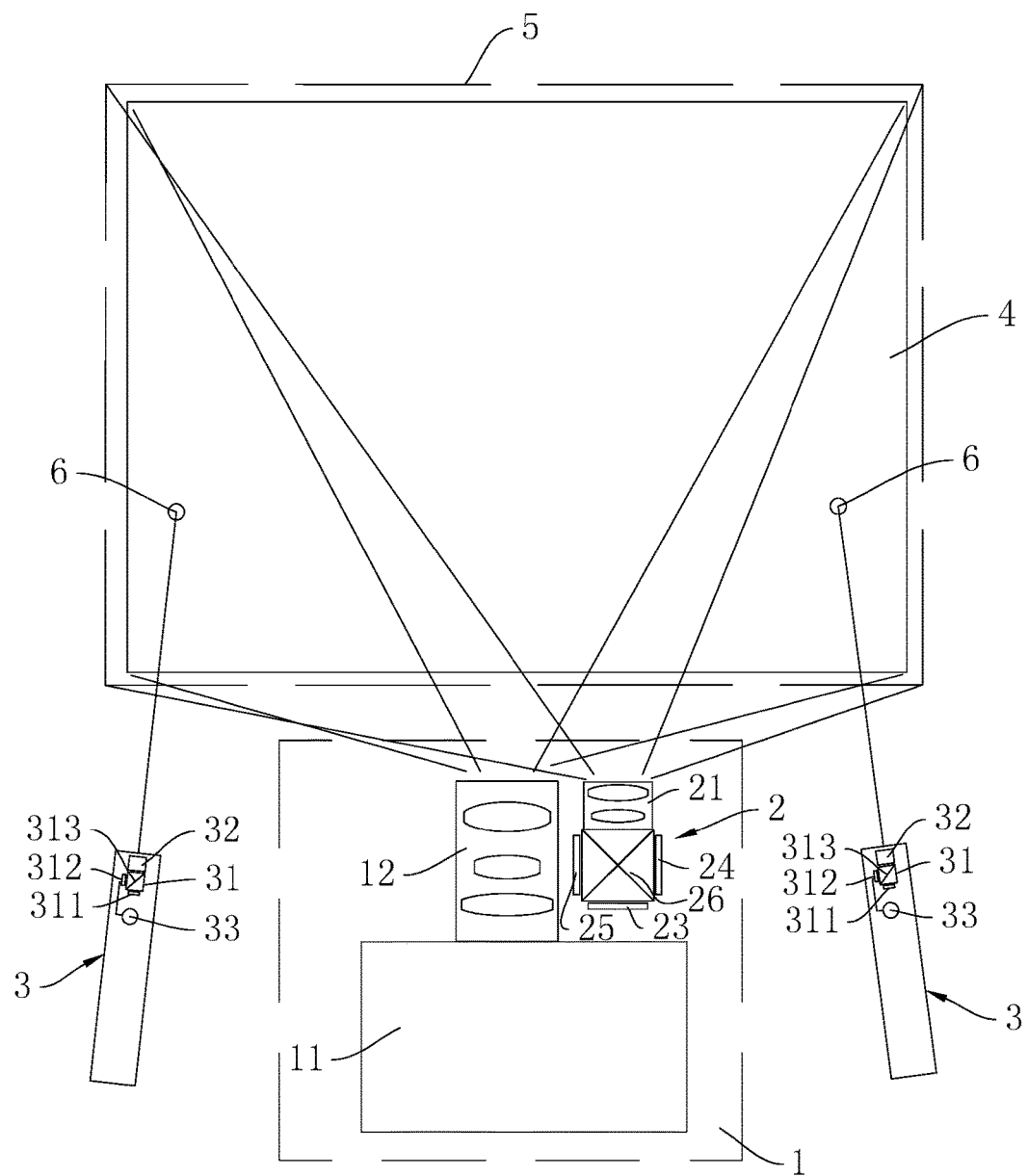
FIG. 2 is a structural diagram for a multi-touch interactive display system according to another embodiment of this disclosure.
Figure 3:
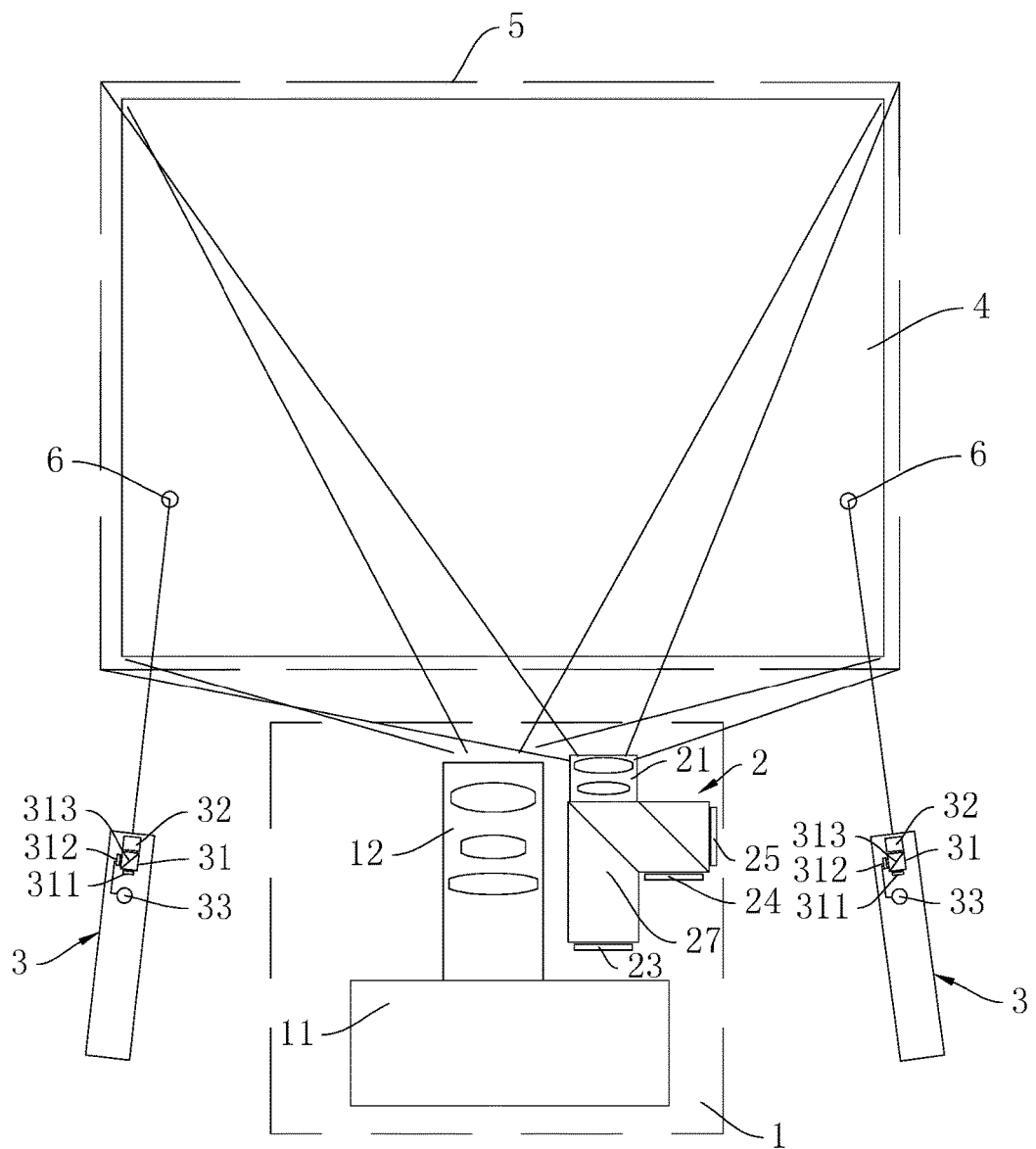
FIG. 3 is a structural diagram for a multi-touch interactive display system according to another embodiment of this disclosure

Referring to FIGS. 1 to 3, when the projector 1 is used as the display unit, a projected image that is projected by the projector 1 is the display image 4, and the monitoring module assembly 2 that is directly opposite to the display image 4 is additionally arranged on the projector 1.

In some embodiments, the projector 1 includes a projector fixture 11 and a projection lens 12, where the projection lens 12 and the monitoring lens 21 are arranged side by side. The projection lens 12 includes at least one lens group that is moveable, where light from the projector fixture 11 passes through the at least one lens group of the projection lens 12 and forms the display image 4 on the screen after being emitted out. It can be understood that the monitoring module assembly 2 can be an independent apparatus, or the monitoring module assembly 2 and the projector 1 are integrated within a same housing.

In some embodiments, the monitoring module assembly 2 includes a monitoring lens 21 for capturing the infrared light spot 6 in the display image 4, a first light splitting element 22 arranged behind the monitoring lens 21, a first infrared monitoring element 23 and a second infrared monitoring element 24. The first light splitting element 22 operates for separating the first infrared light 7 and the second infrared light 8 which have different wavelengths. The first and the second infrared monitoring elements 23 and 24 respectively correspond to the two infrared lights having different wavelengths.

For the remote control unit 3, infrared beams formed by the two infrared lights having different wavelengths are emitted to the display image by the infrared emission module assembly 31 so as to generate the infrared light spot 6. After the infrared light spot 6 is captured by the monitoring lens 21, the first infrared light 7 and the second infrared light 8 that have different wavelengths pass through the first light splitting element 22, and are then imaged onto the first infrared monitoring element 23 and the second infrared monitoring element 24 to respectively form a first imaging image and a second imaging image.

Figure 4:
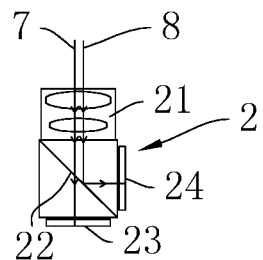
FIG. 4 is a schematic diagram illustrating a light path along which an infrared light enters into the monitoring module assembly in FIG. 1.

Referring to FIG. 4, the first infrared light 7 of the light beam entering into the monitoring lens 21 is refracted by the first light splitting element 22 to be emitted onto the first infrared monitoring element 23 to form the first imaging image; and the second infrared light 8 is reflected by the first light splitting element 22 to the second infrared monitoring element 24 to form the second imaging image.

It can be understood that, a light filter can be arranged within the monitoring lens 21 when there is no need of the visible light 9, and/or a layer of light filtering coating can be provided on the first light splitting element 22 to filter out the visible light 9, thereby ensuring accuracy in infrared light imaging. The light splitting element may further be in the form of a light splitter or a light splitting prism.

The interactive display system supports simultaneous operations of multiple remote control units 3, where each of the remote control units 3 has a mouse-simulating operation mode and/or a touch operation mode.

(1) For the mouse-simulating operation mode, each remote control unit 3 generates the infrared light spot 6 in the display image 4. When the monitoring lens 21 has captured the infrared light spot 6, the two infrared lights having different wavelengths pass through the first light splitting element 22, and then the first infrared light 7 is imaged onto the first infrared monitoring element 23 to form the first imaging image. Position information of the infrared light spot 6 in the first imaging image is outputted to the main control unit from the first infrared monitoring unit. An icon is displayed at the position of the infrared light spot 6 on the display image 4 of the display unit after the main control unit performs the information processing.

(2) For the touch operation mode, each remote control unit 3 generates the infrared light spot 6 in the display image 4. When the monitoring lens 21 has captured the infrared light spot 6, the two infrared lights having different wavelengths pass through the first light splitting element 22, and then the second infrared light 8 is imaged onto the second infrared monitoring element 24 to form the second imaging image. Position information of the infrared light spot 6 in the second imaging image is outputted to the main control unit from the second infrared monitoring unit, and the interactive operation is performed at the position of the infrared light spot 6 on the display image 4 of the display unit after the main control unit performs the information processing.

In some embodiments, using those two infrared lights with different wavelengths provides following advantages: the interactive display system supports simultaneous operations of multiple remote control units 3 that are capable of forming the infrared light spot 6; when each remote control unit 3 is switched to the touch operation mode, i.e., when each infrared light spot 6 is imaged onto the second infrared monitoring unit to form the second imaging image, the interactive operation can be performed at the position of the infrared light spot 6 generated by the remote control unit 3. In this way, maloperation can be effectively prevented when capturing plurality of infrared light spots 6 and the multi-point interactive operation can have improved accuracy, thereby improving human-computer interactive experience and further enhancing convenience in usage.

Figure 5:
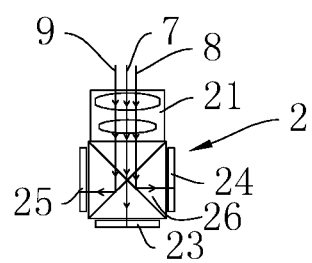
FIG. 5 is a schematic diagram illustrating a light path along which an infrared light and a visible light enter into the monitoring module assembly in FIG. 2.

In some embodiments, the monitoring module assembly 2 can also include a second light splitting element 26 arranged behind the monitoring lens 21 and a visible light monitoring element 25 corresponding to a visible light 9. The second light splitting element 26 operates to separate the visible light 9, the first infrared light 7 and the second infrared light 8 which two infrared lights 7 and 8 have different wavelengths. Here, the second light splitting element 26 mainly operates to separate out the visible light 9 to form an image on the visible light monitoring element 25. Referring to FIG. 5, the second light splitting element 26 can be an X-shaped light splitting element. In this case, the second infrared light 8 of the light beams entering the monitoring lens 21 is reflected with one reflection to be emitted to the second infrared monitoring element 24 for imaging, the visible light 9 of the light beams is reflected with one reflection to be emitted to the visible light monitoring element 25 for imaging, and the first infrared light 7 of the light beams is refracted with one refraction to be emitted to the first infrared monitoring element 23 for imaging.

Figure 6:
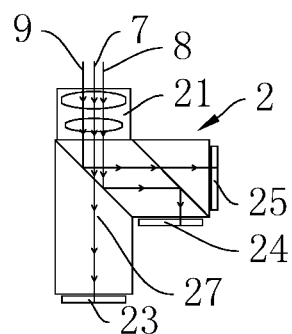
FIG. 6 is a schematic diagram illustrating a light path along which an infrared light and a visible light enter into the monitoring module assembly in FIG. 3.

In some embodiments, the monitoring module assembly 2 can also include a third light splitting element 27 arranged behind the monitoring lens 21 and a visible light monitoring element 25 corresponding to a visible light 9. The third light splitting element operates to separate the visible light 9, the first infrared light 7 and the second infrared light 8 which two infrared lights 7 and 8 have different wavelengths. Here, the third light splitting element 27 mainly operates to separate out the visible light 9 to form an image on the visible light monitoring element 25 as well. Referring to FIG. 6, the third light splitting element 27 can be an L-shaped light splitting element. In this case, the first infrared light 7 of the light beams entering the monitoring lens 21 is refracted with one refraction to be emitted to the first infrared monitoring element 23 for imaging, the second infrared light 8 of the light beams is reflected twice to be emitted to the second infrared monitoring element 24 for imaging, and the visible light 9 of the light beams is reflected with one reflection and refracted with one refraction to be emitted to the visible light monitoring element 25 for imaging.

In some embodiments, all of the above-described first infrared monitoring element 23, the second infrared monitoring element 24 and the visible light monitoring element 25 can be CMOS or CCD chips, and these three can be of the same model. Alternatively, some common models or combinations thereof can be used as such elements according to specific usage scene and requirement.

In some embodiments, the monitoring module assembly 2 can also include a focusing apparatus (not shown in Figures) for driving the movement of the at least one lens groups of the projection lens 12. The focusing apparatus includes a focusing control unit and a focusing motor, where the focusing control unit connects with the visible light monitoring element 25 and the focusing motor connects with the at least one lens group of the projection lens 12. The focusing control unit sends out control signals to the focusing motor, and the focusing motor can then drive the at least one lens group to move.

During specific operation, the focusing control unit analyzes the image formed on the visible light monitoring element 25. If the projected image is not clear enough, the image formed on the visible light monitoring element 25 is unclear neither. In this circumstance, the focusing control unit sends out a focusing command, so that the focusing motor is driven to make the at least one lens group of the projection lens 12 move back and forth until the image formed on the visible light monitoring element 25 becomes clear.

Further, the monitoring lens 21 of the monitoring module assembly 2 captures the projected image of the projector 1 during focusing, and it is required that a monitoring image 5 that is larger than or equal to the projected image should be projected by the monitoring lens 21. Correspondingly, a field angle of the monitoring lens 21 is larger than or equal to that of the projection lens 12.

The foregoing is preferred embodiments rather than limitations of this disclosure. For those skilled in the art, various modifications, combinations and changes can be made to this disclosure. Any modification, equivalents and improvements within the spirit and the principle of this disclosure should be included within the scope of claims of this disclosure.

The invention claimed is:

1. An interactive display system, wherein comprising a main control unit for information processing, a display unit for generating a display image according to received display information, one or more remote control unit(s), and a monitoring module assembly; the main control unit is in communication connection with the display unit and the monitoring module assembly;

each remote control unit comprises an infrared emission module assembly, which infrared emission module assembly is used to emit two infrared lights with different wavelengths to the display image for generating an infrared light spot thereon;

the monitoring module assembly comprises a monitoring lens for capturing the infrared light spot within the display image, a first light splitting element arranged behind the monitoring lens: a first infrared monitoring element and a second infrared monitoring element; the first light splitting element is used for separating a first infrared light and a second infrared light which two have different wavelengths; the first infrared light and the second infrared light having different wavelengths are respectively incident onto the first infrared monitoring element and the second infrared monitoring element;

the interactive display system supports simultaneous operations of a plurality of the remote control units, when one of the remote control units interacts with the display image, others of the remote control units are capable of entering into and generating icons on the display image until receiving interactive commands; wherein, when the monitoring lens captures the infrared light spot generated within the display image by each of the remote control units, the two infrared lights having different wavelengths passing through the first light splitting element, and split out, the first infrared light is split onto the first infrared monitoring element to form a first formed image; position information of the infrared light spot in the first formed image is transferred to the main control unit from the first infrared monitoring unit, thus, the icon is displayed at the position of the infrared light spot on the display image of the display unit according to the information processing by the main control unit.

2. The interactive display system of claim 1, wherein when the monitoring lens captures the infrared light spot generated within the display image by each of the remote control units, the second infrared light is split onto the second infrared monitoring element to form a second formed image; position information of the infrared light spot in the second formed image is transferred to the main control unit from the second infrared monitoring unit, thus, the interactive operation is performed at the position of the infrared light spot on the display image of the display unit after the main control unit performs the information processing.

3. The interactive display system of claim 1, wherein the display unit is a flat panel display unit.

4. The interactive display system of claim 1, wherein the display unit is a projector; the projector is an independent apparatus, or the projector and the monitoring module assembly are integrated within a same housing;

the projector comprises a projector fixture and a projection lens; the projection lens and the monitoring lens are arranged side by side; the projection lens comprises at least one lens group that is moveable, wherein light from the projector fixture passes through at least one lens group of the projection lens and then gets emitted out to form the display image on a screen.

5. The interactive display system of claim 1, wherein the remote control unit further comprises a first infrared emission module, a second infrared emission module, a trigger apparatus and a collimating lens element; the trigger apparatus connects with the second infrared emission module and controls the second infrared emission module to send the interactive operation signal; the infrared emission module assembly comprises a first infrared light source, a second infrared light source and a light merging element;

the first infrared light source emits the infrared light having a first wavelength after having received an emission signal from the first infrared emission module; the trigger apparatus is triggered, and the second infrared light source emits the infrared light having a second wavelength after having received the interactive operation signal from the second infrared emission module; the two infrared lights are merged by the light merging element and then emitted out through the collimating lens element.

6. The interactive display system of claim 5, wherein both the first infrared light source and the second infrared light source comprise an infrared laser light source or an LED infrared light source.

7. The interactive display system of claim 4, wherein the monitoring module assembly also comprises a second light splitting element arranged behind the monitoring lens and a visible light monitoring element corresponding to a visible light; the second light splitting element operates to separate the visible light, the first infrared light and the second infrared light which two infrared lights have different wavelengths.

8. The interactive display system of claim 4, wherein the monitoring module assembly also comprises a third light splitting element arranged behind the monitoring lens and a visible light monitoring element corresponding to a visible light; the third light splitting element operates to separate the visible light, the first infrared light and the second infrared light which two infrared lights have different wavelengths.

9. The interactive display system of claim 7, wherein the monitoring module assembly also comprises a focusing apparatus for driving the movement of the at least one lens group of the projection lens; the focusing device comprises a focusing control unit connected with the visible light monitoring element and a focusing motor connected with the at least one lens group of the projection lens, wherein the focusing control unit sends out control signals to the focusing motor, and the focusing motor drives the at least one lens group to move;

a field angle of the monitoring lens is larger than or equal to that of the projection lens;

the first infrared monitoring element, the second infrared monitoring element and the visible light monitoring element are of the same model.

* * * * *